United States Patent [19]
Irschik et al.

[11] 4,207,503
[45] Jun. 10, 1980

[54] BATTERY SUPPLIED MOTOR CURRENT CONTROL SYSTEM WITH SAFETY CIRCUIT

[75] Inventors: Heinz Irschik; Dieter Kipp, both of Vaihingen; Helmut Harer, Remseck, all of Fed. Rep. of Germany

[73] Assignee: Robert Bosch GmbH, Stuttgart, Fed. Rep. of Germany

[21] Appl. No.: 928,794

[22] Filed: Jul. 28, 1978

[30] Foreign Application Priority Data

Aug. 12, 1977 [DE] Fed. Rep. of Germany ....... 2736304

[51] Int. Cl.² .............................................. H02P 3/00
[52] U.S. Cl. ................................... 318/139; 318/476; 318/459; 318/455
[58] Field of Search ............... 318/139, 246, 341, 454, 318/455, 459, 474, 476, 478, 479

[56] References Cited

U.S. PATENT DOCUMENTS

| | | | |
|---|---|---|---|
| 3,689,818 | 9/1972 | Morton et al. | 318/478 |
| 3,818,291 | 6/1974 | Miyake | 318/139 |
| 3,902,105 | 8/1975 | Delancy et al. | 318/139 |
| 3,914,675 | 10/1975 | Konrad | 318/139 |
| 4,017,775 | 4/1977 | Artrip | 318/139 |
| 4,025,836 | 5/1977 | Naito et al. | 318/139 |
| 4,081,725 | 3/1978 | Schmidt et al. | 318/139 |

*Primary Examiner*—J. V. Truhe
*Assistant Examiner*—Eugene S. Indyk
*Attorney, Agent, or Firm*—Frishauf, Holtz, Goodman & Woodward

[57] ABSTRACT

A controlled switch 4 provides current pulses derived from a battery 3 to a motor 1, having a series field 2 under command of a control unit 8 which provides command pulses for repetitive closing of the controlled switch 4. Current through the motor is sensed by a sensing resistor 6 and connected to a safety circuit 9 which, upon sensing of current flow in the absence of a control pulse from the unit 8, disconnects current to the motor by opening a controlled switch 5. To distinguish between (a) current flowing from the battery 3 and (b) circulating current flowing during pulse gaps in a free-wheeling diode 7 connected across the field and armature of the motor, voltage across the free-wheeling 7 is sensed, thereby effectively sensing the conduction state of the free-wheeling diode and, if the free-wheeling diode is conductive, disabling the safety circuit to prevent spurious operation thereof during flow of inductive, circulating current through the bypass or free-wheeling diode under normal operation.

5 Claims, 1 Drawing Figure

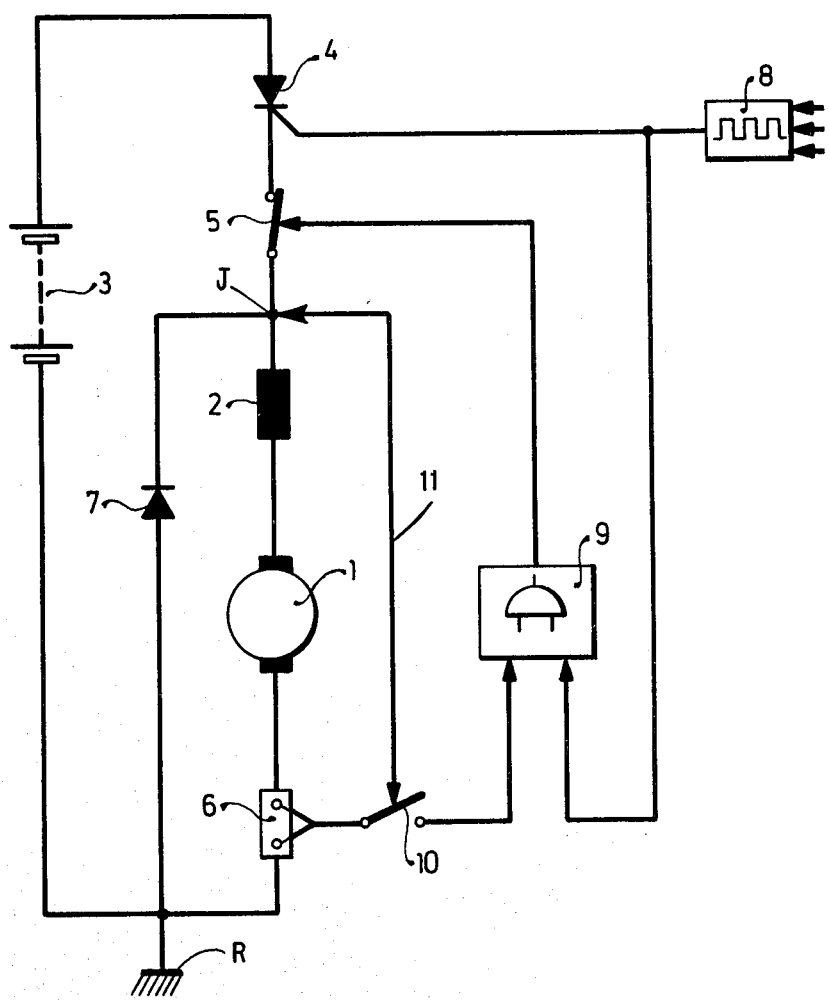

BATTERY SUPPLIED MOTOR CURRENT CONTROL SYSTEM WITH SAFETY CIRCUIT

CROSS REFERENCE TO RELATED PUBLICATION

U.S. Pat. No. 3,689,818.

The present invention relates to a battery supplied motor current control system, and more particularly to an improvement in a safety circuit to prevent current flow through a motor from a battery if an associated control system has become defective.

BACKGROUND AND PRIOR ART

Various types of motor current control systems for electric motors have been proposed in which the current for the motor is supplied by batteries. One such application is in electrically driven vehicles in which current from a secondary battery is supplied to an electric motor in pulse form. The duty cycle of the current supply is controlled by a thyristor, the switching state of which is controlled, in turn, by a control unit. The control unit receives input information in dependence on various operating parameters including, for example, an operator controlled motor controller to regulate the speed of the motor, temperature, charge state of the battery, or the like. To prevent overloading of the motor, it is necessary that the motor be supplied with current only if a command pulse is supplied from the motor control unit. Associating motor current and command pulses can be achieved by monitoring motor voltage or motor current.

It is customary to connect a free-wheeling or bypass diode in parallel to the motor so that inductive current can continue to flow even during pulse gaps from the pulse control unit. U.S. Pat. No. 3,689,818 discloses a control system for an electric power motor, with battery operation, in which a current flow signal is derived and this signal is compared with control pulses from the pulse source. Upon non-coincidence, the pulse control unit is disconnected if a current signal is sensed but no control pulse has commanded current flow. Current supply to the electric motor is then interrupted. Such continued current flow may arise, for example, due to a defect in the motor system, typically in the semiconductor switch which may be the aforementioned thyristor, permitting current to flow through the motor from the battery although no command signal has been received from the pulse control unit.

THE INVENTION

It is an object to improve the operation of a current supplied motor control system, and more particularly to simplify such systems in which a free-wheeling or by-pass diode is utilized.

Briefly, current flow through the free-wheeling diode is sensed, for example by sensing the voltage drop thereacross, this current flow overriding a disconnect signal to prevent initiation of a disconnect signal upon presence of a circulating current indicative of current through the motor in pulse gaps of the command signal. This simple arrangement eliminates the necessity for complex circuitry to prevent spurious disconnection, thereby increasing the reliability of the system. Basically, the different conditions of current flow are sensed when (a) current is supplied by the battery, and the bypass or freewheeling diode is in blocked state; and (b) the free-wheeling or bypass diode is conductive. Control signals representative of current flow through the bypass diode preferably in form of the voltage across the bypass diode are then derived.

DRAWING

Illustrating a preferred example, wherein the single FIGURE is a general block circuit diagram to control current flow from a battery to a motor, typically a motor adapted to drive an electric vehicle.

A motor 1 with a series field winding 2 is supplied with electric current from a storage battery 3. A semiconductor switch 4, typically a thyristor, and controlled by a pulse control source 8, is connected in the series circuit with the motor 1. Additionally, a controlled switch 5 and a measuring resistor 6 are included in this series circuit. A free-wheeling or bypass diode 7 is connected across the motor 1, that is, across its armature and field as well as across the sensing resistor 6. The control input of the semiconductor switch 4 is derived from the pulse source, which has various inputs, for example a command input to command speed of the motor, as schematically indicated by the input arrows to the pulse source 8. Such pulse sources are known, and any pulse source providing sequential output pulses of varying length and varying pulse gaps, in accordance with commanded operation of the motor, can be used. A safety circuit 9 has an input which is also derived from the output of pulse source 8. The second input of the safety circuit 9 is connected from the sensing resistor 6 through a second controlled switch 10. The control input of the first controlled switch 5 is formed by the output from the safety circuit 9; the control input of the second controlled switch 10 is connected in circuit with the cathode of the free-wheeling diode 7.

Operation: In normal operation of the motor 1, the controlled switch 5 is closed—as shown in the figure—and current is supplied from the battery 3 to the motor 1 through the semiconductor switch 4. The average current flow is controlled in accordance with command pulses supplied from the pulse control unit in accordance with desired operating conditions. If the semiconductor switch 4 is in conductive state, current will flow from battery 3 through the semiconductor switch 4, the closed first controlled switch 5, field winding 2, the armature of motor 1 and measuring resistor 6 to ground, reference or chassis R, that is, return to battery 3. If a blocking pulse is supplied to the semiconductor switch 4, current will continue to flow due to the stored energy in the field winding 2. This current will be a circulating current which will flow through the armature of motor 1, measuring resistor 6, and freewheeling diode 7. The motor current, averaged over time, thus is a composite of battery current, flowing when the semiconductor switch 4 is closed and when, accordingly, the diode 7 is in blocked state, and a circulating current which flows when the semiconductor switch 4 is opened and the diode 7 is conductive. The signal which will be derived across the measuring resistor 6 will be proportional to motor current. It is supplied as a second input to the safety circuit 9. The safety circuit 9 compares the motor current pulses with the output pulses from the pulse source 8. In ordinary operation, both pulses occur in synchronism, and the first controlled switch 5, accordingly, will be maintained closed. The safety circuit 9 thus carries out a conjunctive logic operation relating motor current pulses and control current pulses, as symbolically indicated by the AND-gate symbol in unit 9. If the safety circuit 9 recognizes that motor current flows without presence of a control pulse from the source 8, then the first switch 5 is opened since absence of a pulse from the pulse source 8, with continued current flow through the motor, could occur only upon presence of a defect.

Systems of this type are subject to malfunction since the circulating current through the motor 1, and flowing through the diode 7, causes current to flow through the resistor 6 which, unless comparatively complex precautions are taken, can be recognized as a motor current signal due to flow of this current through the sensing resistor 6, which results in a signal which is then transmitted to the safety circuit 9 and causes recognition in the safety circuit 9 of motor current flow during the pulse gaps, that is, when no pulse is present in the control unit 8. Consequently, the safety circuit can trigger the controlled switch 5 to shut off entirely although there is no defect in the system.

In accordance with the invention, current flow through the motor (1) due to the battery, or (2) as a circulating current, is reliably distinguished without an additional measuring resistor by sensing when current flows through the free-wheeling diode 7 and then, accordingly, suppressing the current-presence from the resistor 6 at the input to the safety circuit 9. The voltage across the free-wheeling diode, that is, as shown the voltage at the cathode, of the free-wheeling diode at junction J, is sensed as schematically shown by line 11 and utilized to control the second controlled switch 10 connected between the measuring or sensing resistor 6 and the second input of the safety circuit 9. Erroneous or spurious triggering of the safety circuit 9 due to circulating current while the semiconductor switch 4 is in blocked state is thereby reliably avoided.

Various changes and modifications may be made within the scope of the inventive concept.

We claim:

1. Battery supplied motor cu-rent control system having
    a motor (1);
    a controlled switch (4) serially connected in the current supply to the motor;
    control circuit means (8) responsive to a pulse command signal and providing a control pulse output, connected to and commanding repetitive conduction and blocking of current flow through the controlled switch (4);
    a disconnect switch (5) connected in series circuit with the motor (1);
    a free-wheeling diode (7) connected in circuit with the motor and carrying current during blocking of said controlled switch (4);
    safety circuit means (5, 6, 9) sensing (a) actual current flow through the motor (b) said control signal means pulse output provided by said control circuit means which controls current flow through the motor, and (c) providing a disconnect signal to said disconnect switch (5) and effective to disconnect current flow conjunctively in the absence of a command signal from said control circuit means commanding current flow AND sensed current flow;
    and comprising, in accordance with the invention,
    means (11) sensing current flow through the free-wheeling diode (7) and
    means (10) responsive to said sensed current flow through the free-wheeling diode overriding said disconnect signal
    to prevent providing said disconnect signal upon presence of circulating inductive current through the motor and the free-wheeling diode during pulse gaps in said command signal.

2. System according to claim 1, wherein the means sensing current flow through the free-wheeling diode (7) comprises a circuit (11) sensing voltage drop across the free-wheeling diode, upon current flow therethrough.

3. System according claim 1, wherein the means sensing current flow through the free-wheeling diode (7) comprises circuit means (11) sensing the conduction state of said free-wheeling diode (7).

4. System according to claim 1, wherein the safety circuit means includes a sensing resistor (6), serially connected with the motor (1);
    the free-wheeling diode is connected across at least the armature and the field (2) of said motor;
    and the means sensing current flow through the free-wheeling diode (7) comprises a circuit connection (11) sensing voltage drop across the free-wheeling diode.

5. System according to claim 4, wherein the motor is a series motor having a serially connected armature and field (2), the means sensing the voltage drop across the free-wheeling diode (7) comprises means (11) discriminating between the operating voltage derived from said battery and connected across the series connection of the field and armature of the motor and the inherent and minimal voltage drop across the free-wheeling diode upon interruption of current flow from the battery and upon presence of circulating inductive current due to the energy stored in the field (2).

* * * * *